United States Patent
Rohrbach et al.

(10) Patent No.: US 6,640,560 B2
(45) Date of Patent: Nov. 4, 2003

(54) DISTRIBUTED ELECTRONIC CONTROL FOR AIR CONDITIONING SYSTEM

(75) Inventors: Eric Rohrbach, Lebanon, CT (US); John M. Maljanian, Jr., Farmington, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 168 days.

(21) Appl. No.: 09/876,378

(22) Filed: Jun. 7, 2001

(65) Prior Publication Data

US 2002/0184902 A1 Dec. 12, 2002

(51) Int. Cl.[7] .............................. F25B 7/00; G05D 23/00
(52) U.S. Cl. ............................. 62/86; 62/172; 62/175; 236/51
(58) Field of Search ........................... 62/175, 172, 86; 236/51

(56) References Cited

U.S. PATENT DOCUMENTS

| | | | | |
|---|---|---|---|---|
| 5,224,648 A | * | 7/1993 | Simon et al. ............... | 236/51 |
| 5,390,206 A | * | 2/1995 | Rein et al. ................. | 375/1 |
| 5,511,385 A | * | 4/1996 | Drew et al. ................ | 62/172 |
| 6,098,413 A | * | 8/2000 | Wada ........................ | 62/127 |

* cited by examiner

Primary Examiner—William Wayner
(74) Attorney, Agent, or Firm—Carlson, Gaskey & Olds

(57) ABSTRACT

An electronic control for an air conditioning system is provided. The system includes first and second air conditioning packs located in the air craft remote from one another. Each pack includes a pack controller in the same location as the pack. The pack controllers produce operating instruction signals to the packs for instructing the packs to produce conditioned air in response to a reference signal. A supervisory controller is centrally located in aircraft, preferably in the electronics equipment bay, and is connected to each of the pack controllers. The supervisory controller produces the reference signal to the pack controllers. In addition to controlling the operation of the packs, the pack controllers preferably include prognostics for monitoring the packs and diagnosing problems. The distributed electronic controllers of the present invention utilized for the packs may similarly be applied to the zone trim system and the engine air bleed valves.

21 Claims, 2 Drawing Sheets

DISTRIBUTED ELECTRONIC CONTROL FOR AIR CONDITIONING SYSTEM

BACKGROUND OF THE INVENTION

This invention relates to an air conditioning system, and more particularly, the invention relates to a distributed electronic control for an air conditioning system of an aircraft.

Air conditioning systems are typically connected to a controller that controls a refrigeration unit to obtain a desired temperature. The controls for an air conditioning system can become relatively complex, particularly for applications in aircraft. Aircraft typically incorporate numerous packs, or refrigeration units, such as turbine driven air cycle or vapor cycle turbo machines. The packs are located throughout the aircraft and deliver conditioned air to a manifold. Air is bled from the engines propelling the aircraft and is piped through a manifold to the packs.

A primary supervisory controller has been employed in aircraft to control the packs, monitor temperatures within the air conditioning system, operate trim valves controlling the flow of air from the engine to the manifold, and interface with the flight deck. The primary supervisory controller has been located in an electronics equipment bay along with electronic equipment for other aircraft systems. As a result, the size of the controller and, therefore, the capability of the controller such as system Built-In-Test (BIT), diagnostics and prognostics capability has been limited. Because the primary supervisor controller has controlled operation of the packs and other air conditioning components, large bundles of wires, frequently between 70 and 80 wires, are connected to each of the packs in the respective locations throughout the aircraft. Each wire bundle from the primary supervisor controller to the pack may be up to 70 to 80 feet in length. As a result, the wires from the primary supervisor controller to the packs account for a significant amount of weight and present reliability issues due to the large number of wires and wire connections.

The number of packs and engines varies between aircraft platforms. The electronic control for the air conditioning system does not accommodate the different number of components between platforms. As a result, significant changes to the controls are required between platforms. Therefore, what is needed is an electronic control for the air conditioning system of an aircraft that reduces the number of wires between the electronic components and increases the capability of the controllers. Similarly, another central controller has been utilized to control the bleed valves on the engines for supplying hot, pressurized air to the packs and other aircraft systems.

SUMMARY OF THE INVENTION AND ADVANTAGES

The present invention provides an electronic control for an air conditioning system. The system includes first and second air conditioning packs located in the aircraft remote from one another. Each pack includes a pack controller in the same location as the pack. The pack controllers produce operating instruction signals to the packs for instructing the packs to produce conditioned air in response to pack reference signals. A supervisory controller is located in aircraft, preferably in the electronics equipment bay, and is connected to each of the pack controllers. The supervisory controller produces the pack reference signal to the pack controllers. In addition to controlling the operation of the packs, the pack controllers preferably include BIT, diagnostics, and prognostics for monitoring the packs and diagnosing problems. The run of wires from the supervisory controller to the packs may be greatly reduced, from the 70 to 80 wires typically used, to under 10 wires. The distributed electronic controllers of the present invention utilized for the packs may similarly be applied to the zone trim system and the engine air bleed valves.

Accordingly, the above invention provides a distributed electronic control for the air conditioning system of an aircraft that reduces the number of wires between the electronic components and increases the capability of the controllers while providing increased system reliability, flexibility, dispatchability, maintainability due to use of common components, as well as ease of installation.

BRIEF DESCRIPTION OF THE DRAWINGS

Other advantages of the present invention can be understood by reference to the following detailed description when considered in connection with the accompanying drawing wherein.

DETAILED DESCRIPTION OF THE PREFERRED EMBODIMENT

Figure 1:
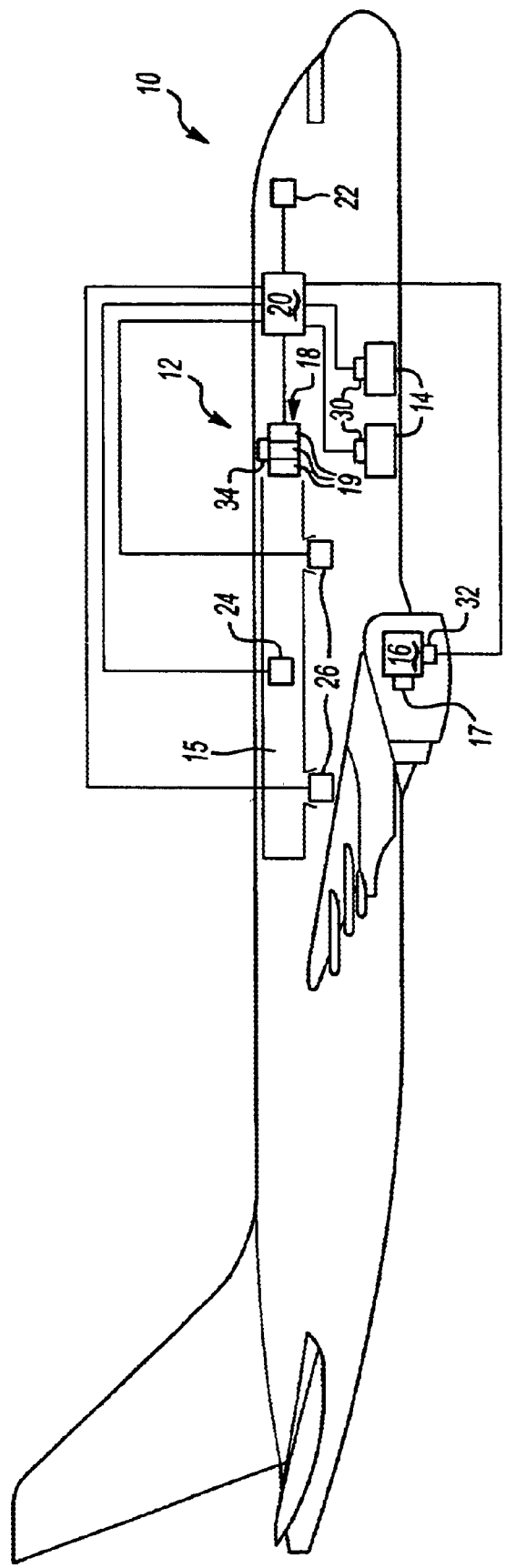
FIG. 1 is a simplified view of an aircraft incorporating the present invention air conditioning system.
Figure 2:
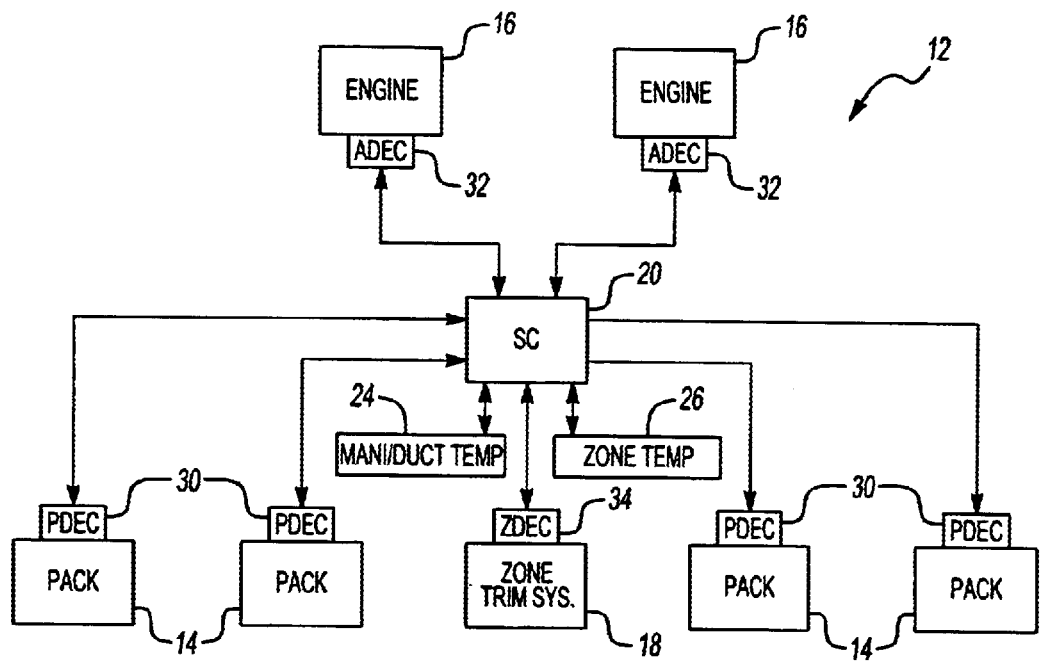
FIG. 2 is a schematic view of the present invention air conditioning system.

An air conditioning system 12 for an aircraft 10 is shown in FIGS. 1 and 2. The air conditioning system 12 includes a plurality of packs 14 distributed throughout the aircraft 10 for producing conditioned air. Although four packs are shown in FIG. 2, any number may be used. The conditioned air from the packs 14 is fed to a manifold and system of ducts 15. The relatively cold air in the manifold 15 preferably is adjusted to a desired temperature. Engines 16 utilized to propel the aircraft 10 include bleed valves 17 for providing hot pressurized air to the zone trim system 18 to adjust the temperature of the air therein. Although two engines are shown in FIG. 2, any number may be used on an aircraft.

The air conditioning system 12 includes a zone trim system 18 having a plurality of trim valves 19 that may be adjusted to selectively deliver air to different zones within the aircraft 10. A supervisory controller 20 is operatively connected to the packs 14, engines 16, and zone trim system 18 to control the temperature throughout the aircraft 10. A flight deck interface 22 is connected to the supervisory controller 20 by which flight personal may input system commands such as desired temperature. Furthermore, the flight personal may obtain information about the air conditioning system 12 through the flight deck interface 22. The supervisory controller 20 preferably is connected to a manifold duct temperature sensor 24 for obtaining a temperature within the manifold and ducts 15. The supervisory controller 20 preferably is also connected to a plurality of zone temperature sensors 26 so that the supervisory controller 20 may monitor the temperature throughout the various locations in the aircraft. The supervisory controller 20 utilizes the temperature sensors 24 and 26 and the desired temperature selected at the flight deck interface 22 to send pack reference signals to the packs 14.

As discussed above, the supervisory controller 20 typically has been responsible for controlling the operation of the packs 14, the bleed valves 17 and the zone trim system 18, which has limited the processing capability of the supervisory controller 20. The number of wires from the supervisory controller 20 to each of these components was significant to communicate with all of the devices associated with each of the components. The present invention utilizes numerous specialized controllers located at particular air conditioning components to reduce the number of wires, increase reliability and processing capability of the air conditioning system 12. Furthermore, system flexibility between aircraft platforms may be improved.

Figure 3:
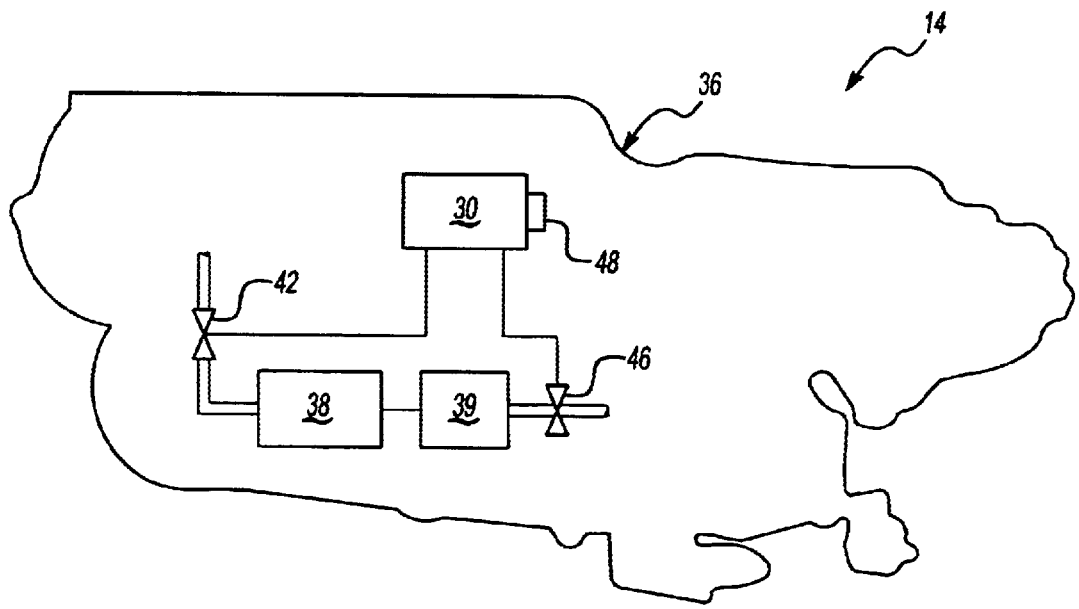
FIG. 3 is a schematic view of an air conditioning pack according to the present invention.

By way of example only, a pack 14 includes a turbo machine 36 having a turbine 38 for pumping fluid through the pack 14 thereby generating a refrigerator cycle producing conditioned air, as shown in FIG. 3. The pack 14 includes a heat exchanger, condenser and compressor driven by the turbine 38, generally indicated at 39 for generating the refrigeration cycle, as is well known in the art. The pack 14 may include such devices as a flow valve 42 for controlling the flow of conditioned air. The pack 14 may also include temperature control valves 46 for further regulating the production of conditioned air. A pack distributed electronic controller (PDEC), or pack controller 30, is located proximate to the pack 14, preferably on the pack, to monitor and control the various valves and sensors associated with the operation of the pack by producing operating instruction signals. Furthermore, the pack controller 30 preferably includes prognostics for monitoring the operation of the packs and diagnosing problems. The pack controller 30 includes a wire connector 48 for connecting wires from the supervisory controller 20 to the pack control 30, which may be reduced to under 10 wires with the present invention. A connector exists between PDEC and associates transducers, actuators, and sensors within the pack.

Similarly, an air distributed electronic controller (ADEC), or air controller 32, may be located proximate to each of the engines 16 to control and monitor the operation of the bleed valves 17. The air controller 32 monitors and controls the air temperature and air pressure through the bleed valve 17. The supervisory controller 20 is connected to each of the air controllers 32 and communicates system mode and demand information. The air controller 32 provides regulated pressurized air to the packs zone trim system.

A zone distributed electronic controller (ZDEC), or zone controller 34, monitors and operates the zone trim system 18, which includes the trim valves 19 for adjusting the air temperature for each of the zones. The zone controller 34 produces trim valve actuation instruction signals to the trim valves 19 in response to a trim valve actuation request signal from the supervisory controller 20.

In operation, the supervisory controller 20 takes information from the flight deck interface 22 and the manifold and duct temperature sensor 24 and zone temperature sensors 26 to determine the desired operational mode for the packs 14 and bleed valves 17. The command signals are respectively received by the pack controller 30 and air controller 32, which respectively operate the packs 14 and bleed valves 17. That is, the controllers 30 and 32 are responsible for the operation and monitoring of the packs 14 and bleed valves 17 while the supervisory controller 20 is only concerned with obtaining conditioned air but is not concerned with the details of how the air is generated. The supervisory controller 20 produces a trim valve actuation request signal to the zones controller 34, which in turn, controls the various trim valves 19 to obtain desired temperatures in the zone throughout the aircraft 10.

The processing and prognostics capability of the air conditioning system is increased by the present invention. The supervisory controller 20, which is preferably located in the electronics equipment bay, may have a larger size and increased processing capability due to the reduced responsibility for the other air conditioning system components such as the packs, bleed valves, and zone trim system. By utilizing numerous controllers such as the pack controllers 30, air controllers 32, and zone controller 34, processing and prognostic capabilities may be increased at each of these controllers. Furthermore, the weight of the air conditioning system is reduced by reducing the number of wires, which may save up to 100 pounds or more. Additionally, the reliability of air conditioning system is improved by reducing the number of wires and connections. Improved A/C dispatchability is achieved due to distributed functions where loss of a single controller (PDEC 30) does not result in the loss of the other packs. Additionally, improved system maintainability is achieved due to more common components between aircraft platforms. Finally, the flexibility of the air conditioning system is increased by providing a modular air conditioning system in which a varying number of distributed electronic controllers may be connected to the supervisory controller 20 with minimal modifications for various aircraft platforms.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. An air conditioning system comprising:

first, second and third vehicle locations remote from one another;

first and second air conditioning packs including first and second pack controllers, respectively, with said first and second packs in said first and second locations, respectively, said pack controllers producing operating instruction signals to said packs for producing conditioned air in response to reference signals, said pack controllers including prognostics monitoring of said packs; and a supervisory controller in said third location connected to said pack controllers, said supervisory controller producing said reference signals to said pack controllers.

2. The system according to claim 1, wherein each of said packs includes a turbo machine having a refrigeration cycle generating said conditioned air.

3. The system according to claim 1, wherein said third location is an electronics equipment bay housing a plurality of electronics equipment.

4. The system according to claim 1, further including a flight deck control interface connected to said supervisory controller, said interface providing air conditioning system information and receiving system command inputs.

5. The system according to claim 1, further including a plurality of temperature sensors connected to said supervisory controller with said supervisory controller producing said reference signals in response to temperatures sensed at said temperature sensors.

6. The system according to claim 5, wherein said plurality of temperature sensors includes manifold sensors sensing temperature of air flowing through a manifold.

7. The system according to claim 5, wherein said plurality of temperature sensors includes a plurality of zone sensors sensing temperature of air in a plurality of vehicle zones.

8. The system according to claim 1, further including fourth and fifth vehicle locations remote from one another and from said first, second and third vehicle locations with first and second gas turbine engines in said fourth and fifth locations, respectively, said first and second engines including first and second bleed valves, respectively, and first and second air controllers, respectively, producing valve actuation instruction signals to control air flow from said engines through said bleed valves for producing regulated pressurized air in response to reference signals, said supervisory controller connected to said first and second controllers, and said supervisory controller producing said reference signals to said first and second air controllers.

9. The system according to claim 8, wherein said air controllers include prognostics monitoring said bleed valves for diagnosing problems with said bleed valves.

10. The system according to claim 1, further including a zone trim system including a zone controller connected to a plurality of zone trim valves controlling air flow to a plurality of zones, said zone controller producing trim valve actuation instruction signals to said trim valves in response to a trim valve actuation request signal, said supervisory controller connected to said zone controller with said supervisory controller producing said trim valve actuation request signal.

11. The system according to claim 10, wherein said zone controller includes prognostics monitoring said trim valves for diagnosing problems with said trim valves.

12. The system according to claim 1, wherein said pack controllers include prognostics monitoring and BIT monitoring said packs for diagnosing problems with said packs.

13. An aircraft air conditioning pack comprising:
a turbo machine including a turbine pumping fluid through the packs for generating a refrigeration cycle producing conditioned air;
a flow control valve in the pack controlling flow of fluid from a bleed valve into the pack;
a temperature control valve further regulating the production of conditioned air; and
a pack controller on said turbo machine including an input connector adapted for connection to a supervisory controller, said pack controller connected to said valves producing operating instruction signals to said valves for controlling the flow of fluid and production of conditioned air.

14. The pack according to claim 13, wherein said pack controller includes prognostics monitoring and BIT monitoring said valves and sensors for diagnosing problems with said valves and sensors.

15. A method of controlling an air conditioning system comprising the steps of:
a) sending reference signal from a supervisory controller to a plurality of pack controllers in locations remote from the supervisory controller;
b) sending operating instruction signals from the pack controllers to corresponding, proximately located packs in response to the reference signals;
c) sending system mode and demand information from the supervisory controller to a plurality of air controllers in other locations remote from the supervisory controller;
d) sending valve actuation instructions from the air controllers to a corresponding, proximately located bleed valves to generate regulated pressurized air;
e) sending a trim valve actuation request signal from the supervisory controller to a zone controller in another location remote from the supervisory controller; and
f) sending trim valve actuation instructions from the zone controller to a plurality of zone trim valves in response to the trim valve actuation request signal.

16. The method of claim 15, further including the step of monitoring the zone trim valves with the zone controller for diagnosing problems with the trim valves.

17. The method of claim 15, further including the step of monitoring the bleed valves for diagnosing problems with the bleed valves.

18. The method of claim 15, further including the step of monitoring the packs for diagnosing problems with the packs.

19. An air conditioning system comprising:
first and second vehicle locations remote from one another and a third vehicle location proximate to said first location and remote from said second location;
an air conditioning pack producing conditioned air including a pack controller proximate to said pack, said pack and pack controller respectively in said first and second locations with a first connection interconnecting said pack and pack controller, said pack controller producing operating instruction signals to said packs over said first connection commanding said pack to produce said conditioned air in response to reference signals; and
a supervisory controller in said third location with a second connection interconnecting said supervisory controller to said pack controller, said supervisory controller producing said reference signals to said pack controller over said second connection.

20. An aircraft air conditioning pack comprising:
a turbo machine including a turbine pumping fluid through the packs for generating a refrigeration cycle producing conditioned air;
a flow control valve in the pack controlling flow of fluid from a bleed valve into the pack;
a temperature control valve further regulating the production of conditioned air; and
a pack controller proximate to said aircraft air conditioning pack with said pack controller including an input connector adapted for connection to a supervisory controller, said pack controller connected to said valves producing operating instruction signals to said valves for controlling the flow of fluid and production of conditioned air.

21. A method of controlling an air conditioning system comprising the steps of:
a) sending reference signal from a supervisory controller to a pack controller in a first location remote from the supervisory controller;
b) sending operating instruction signals from the a pack controller to a proximately located pack in response to the reference signals;
c) sending system mode and demand information from the supervisory controller to an air controllers in a second location remote from the supervisory controller;
d) sending valve actuation instructions from the air controller to a proximately located bleed valve to generate regulated pressurized air;
e) sending a trim valve actuation request signal from the supervisory controller to a zone controller in a third location remote from the supervisory controller; and
f) sending trim valve actuation instructions from the zone controller to a zone trim valve in response to the trim valve actuation request signal.

* * * * *